(12) United States Patent
Kato et al.

(10) Patent No.: US 6,614,469 B1
(45) Date of Patent: Sep. 2, 2003

(54) METHOD AND APPARATUS FOR DETECTING DEVIATION OF AUTOMOBILE FROM LANE

(75) Inventors: Shin Kato, Tsukuba (JP); Sadayuki Tsugawa, Tsukuba (JP)

(73) Assignee: Japan as represented by Director General of Agency of Industrial Science and Technology, Tokyo (JP)

(*) Notice: Subject to any disclaimer, the term of this patent is extended or adjusted under 35 U.S.C. 154(b) by 0 days.

(21) Appl. No.: 09/462,458

(22) PCT Filed: Mar. 31, 1999

(86) PCT No.: PCT/JP99/01688

§ 371 (c)(1),
(2), (4) Date: Jan. 10, 2000

(87) PCT Pub. No.: WO99/60545

PCT Pub. Date: Nov. 25, 1999

(30) Foreign Application Priority Data

May 19, 1998 (JP) .......................................... 10-136633

(51) Int. Cl.$^7$ ................................................ H04N 7/18
(52) U.S. Cl. ..................................................... 348/148
(58) Field of Search ................................. 348/118, 119, 348/148, 149, 169; 382/103, 104; 700/187, 252; 701/1, 23, 28, 41, 200, 36; H04N 7/18

(56) References Cited

U.S. PATENT DOCUMENTS

| | | | |
|---|---|---|---|
| 5,140,236 A | * | 8/1992 | Kawamura et al. ......... 700/187 |
| 5,448,487 A | | 9/1995 | Arai |
| 5,485,378 A | | 1/1996 | Franke et al. |
| 5,765,116 A | * | 6/1998 | Shank ........................ 348/119 |
| 5,913,375 A | * | 6/1999 | Nishikawa ................... 701/28 |
| 6,055,467 A | * | 4/2000 | Mehring et al. .............. 701/41 |
| 6,091,833 A | * | 7/2000 | Yasui et al. ................. 348/118 |
| 6,219,609 B1 | * | 4/2001 | Matsuno et al. .............. 701/41 |
| 6,269,897 B1 | * | 8/2001 | Tamura et al. ................ 701/23 |

FOREIGN PATENT DOCUMENTS

| | | |
|---|---|---|
| EP | 0 394 474 | 10/1990 |
| EP | 0 640 903 | 3/1995 |
| JP | 62-33607 | 7/1987 |
| JP | 7-89443 | 4/1995 |
| JP | 8-16998 | 1/1996 |
| JP | 9-218937 | 8/1997 |

OTHER PUBLICATIONS

S. Tsugawa, et al., 1990 Japan—USA Symposium on Flexible Automation, pps. 143–146, "Steering Control Algorithm for Autonomous Vehicle", 1990.

* cited by examiner

Primary Examiner—Richard Lee
(74) Attorney, Agent, or Firm—Oblon, Spivak, McClelland, Maier & Neustadt, P.C.

(57) ABSTRACT

It is detected whether an automobile is running in a direction departing from a traffic lane, has already departed from the lane, or is running in a direction recovering from departure, by mounting on the automobile a steering angle detecting device for detecting an actual steering angle based on steering wheel operation of a driver, a television camera for taking pictures of the lane and a computer for processing the pictures taken by the television camera. The television camera is used to take pictures of markers on the lane while the automobile is running on the lane, and video signals are input into the computer. The computer is then used to process the input signals, thereby setting a virtual reference line forming a cubic curve approximating the set virtual reference line, calculating a virtual standard steering angle from a coefficient of a function representing the cubic curve, and comparing the steering angle detected by the detecting device based on the steering wheel operation of the driver with the virtual standard steering angle calculated by the computer.

2 Claims, 2 Drawing Sheets

METHOD AND APPARATUS FOR DETECTING DEVIATION OF AUTOMOBILE FROM LANE

BACKGROUND OF THE INVENTION

1. Field of the Invention

The present invention relates to a method and apparatus for detecting departure of a running automobile from a traffic lane, characterized by mounting, on an automobile, steering angle detecting means for detecting a steering angle based on the steering wheel operation of a driver, a television camera, and a computer for processing a video signal from the television camera, and comparing the steering angle detected by the steering angle detecting means with a virtual standard steering angle that is calculated by the computer to drive the automobile without lane departure.

2. Discussion of the Background

There have been proposed a number of methods for autonomously guiding a running automobile to a destination. One of the present inventors has proposed such a method in JP-B SHO 62-33607, for example. This prior art method comprises setting a suitable number of target points between a starting place and a destination, causing an automobile to follow the target points successively, thereby automatically guiding the automobile to the destination.

There has been proposed an extension of the prior method in a technical paper (1990 JAPAN-U.S.A. Sympo. on FA), one of the authors of which is one of the present inventors. In the extension a method is presented in which an automobile is autonomously guided along a traffic lane with a reference live like a lane marker.

SUMMARY OF THE INVENTION

In view of the above, it is one object of the present invention to provide a method and apparatus for detecting departure of a running automobile from a traffic lane by comparing a steering angle based on the steering wheel operation of a driver and a steering angle that is calculated to drive the automobile along the traffic lane.

The present invention discloses a method characterized in that it is detected whether an automobile is running in a direction departing from a traffic lane, has already departed from the lane, or is running in a direction recovering from the departure, by mounting on the automobile steering angle detecting means for detecting a steering angle based on the steering wheel operation of a driver, a television camera for taking pictures of the lane and a computer for processing the pictures taken by the television camera, using the television camera to take pictures of markers on the lane while the automobile is running on the lane, inputting video signals into the computer, using the computer to process the input signals, thereby setting a virtual reference line, forming a cubic curve approximating the set virtual reference line, calculating a virtual standard steering angle from a coefficient of a function representing the cubic curve, and comparing the steering angle detected by the detecting means based on the steering wheel operation of the driver with the virtual standard steering angle calculated by the computer; and also discloses an apparatus for carrying out the method.

Since anything present on a lane, including a lane partitioning line, curbstones, the shoulders of a road, etc., can be used as the lane markers referred to above, in the present invention, it is possible to detect the departure of an automobile from any traffic lane, thereby making it possible to greatly reduce the number of traffic accidents and the like.

DESCRIPTION OF THE PREFERRED EMBODIMENTS

The present invention will be described in detail with reference to the accompanying drawings.

Figure 1:
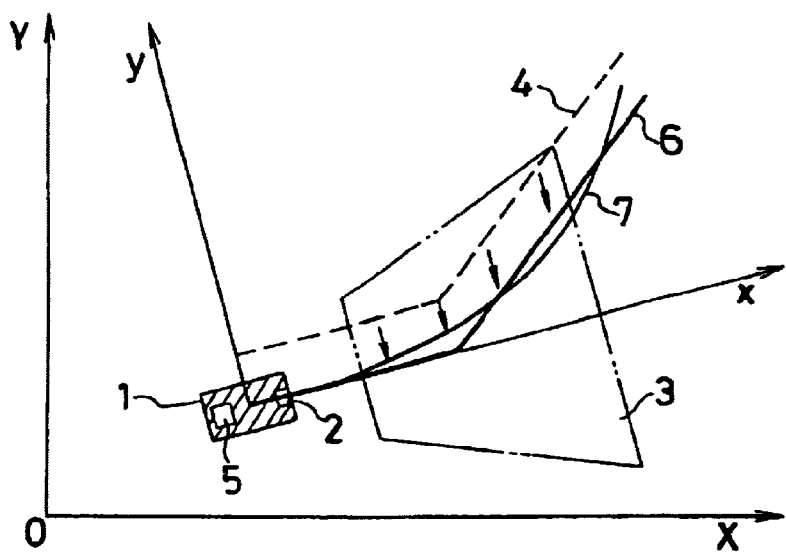
FIG. 1 is a schematic view explaining a method for detecting departure of a running automobile from a traffic lane according to the present invention, FIG. 2 a schematic view showing the configuration of an apparatus for detecting departure of a running automobile from a traffic lane according to the present invention, and FIG. 3 a schematic view showing the results of computer simulation for explaining the method for detecting departure of a running automobile from a traffic lane according to the present invention.

The principle of a method for detecting departure of a running automobile from a traffic lane will be described on the basis of FIG. 1. A television camera 2 is mounted on an automobile 1, lane markers 4 on a traffic lane on which the automobile 1 is to be driven are set within a field of view 3 of the television camera 2, and pictures of the markers are taken using the television camera 2.

As the markers 4, there can be adopted lines and the like existing in a dotted or continuous manner along a traffic lane, such as center line on a traffic lane, lane partitioning lines on a roadway having two or more lanes, curbstones on a lane, the shoulders of a road and the like.

Also mounted on the automobile 1 is a computer 5 for processing signals corresponding to the marker pictures taken by the television camera 2. The video signals are input into the computer 5 that defines a virtual reference line 6 along the makers 4, forms a cubic curve 7 approximating the reference line 6, and processes a virtual standard steering angle of the running automobile 1 from a coefficient of a function representing the cubic curve 7.

The automobile 1 has a steering system provided with steering angle detecting means that detects the actual steering angle of the automobile 1 based on the steering wheel operation of a driver.

The actual steering angle detected by the steering angle detecting means based on the steering wheel operation of a driver is compared with the virtual standard steering angle calculated by the computer 5. If a difference exists between the two angles, this indicates that the running automobile will be departing or has departed from the traffic lane.

To be specific, when the standard steering angle calculated by the computer 5 is expressed by $\alpha v(t)$ and the actual steering angle based on the steering wheel operation of a driver is expressed by $\alpha h(t)$, it can be judged from $|\alpha v(t)-\alpha h(t)| \geq K$, wherein K stands for a threshold value, whether or not the running automobile has departed from the traffic lane. When $K=|\alpha v(t)-\alpha h(t)|$, it can be judged that the running automobile will not be departing or has not departed from the traffic lane. When $K<|\alpha v(t)-\alpha h(t)|$, it can be judged that the running automobile will be departing or has departed from the traffic lane, although depending on the threshold value.

In addition, when a given time period (t−1) and a fixed time period (t) after the time period (t−1) satisfy the relation of $|\alpha v(t-1)-\alpha h(t-1)|-|\alpha v(t)-\alpha h(t)|<0$, it can be judged that the automobile is running in a direction departing from the traffic lane. When the two time periods satisfy the relation of $|\alpha v(t-1)-\alpha h(t-1)|-|\alpha v(t)-\alpha h(t)|<0$, it can be judged that the automobile is running in a direction recovering from the departure.

Again, from the aforementioned value it is possible to judge that the running automobile has departed from the traffic lane.

Using these numerical values effectively, therefore, it is possible to give visual, aural, or tactile information or warning for recovery to the driver when the automobile has departed from a traffic lane. Detection of irregular steering operations by drunk drivers, drowsy drivers and other such drivers can be judged not only from steering patterns but also from the aforementioned threshold value etc.

Figure 2:
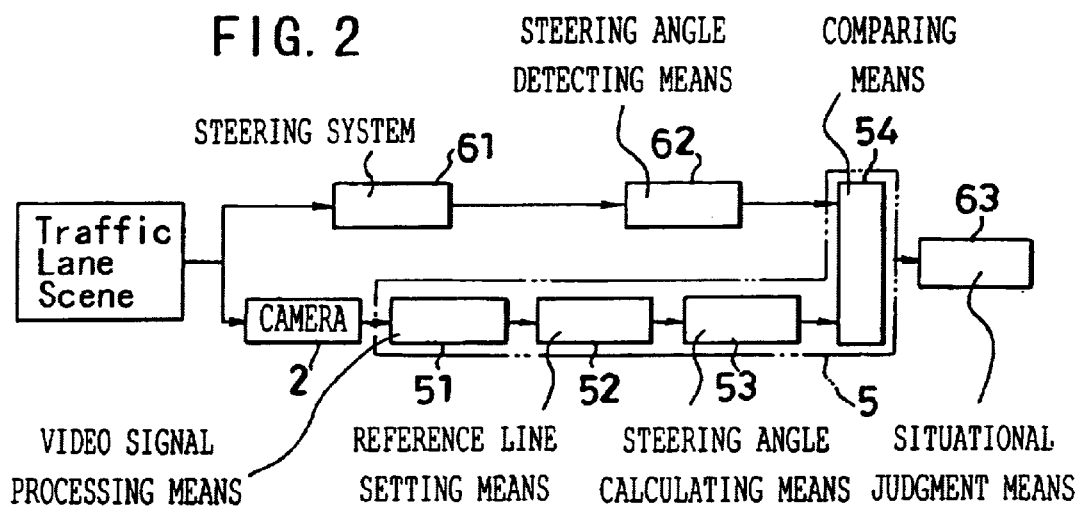

One embodiment of an apparatus for detecting the departure of a running automobile from a traffic lane according to the present invention will be described with reference to FIG. 2.

As explained above, the television camera 2 and computer 5 are mounted on the automobile 1. The computer 5 includes video signal processing means 51 that processes signals of lane marker pictures taken by the television camera 2, reference line setting means 52 that sets a virtual reference line based on the processed signals output from the video signal processing means 51, steering angle calculating means 53 that forms a cubic curve 7 based on signals output from the reference line setting means 52 and finds a virtual standard steering angle based on a coefficient of a function represented by the cubic curve 7, and comparing means 54.

The comparing means 54 is adapted to compare a standard steering angle from the steering angle calculating means 53 with an actual steering angle produced from a steering system 61 etc. operated by the driver in the course of running of an automobile 1, and output from steering angle detecting means 62, and to output a judgment. The judgment output from the comparing means 54 is sent to situational judgment means 63 that detects and judges whether the automobile 1 is running in a direction departing from a traffic lane, has departed from the traffic lane or is running in a direction recovering from the departure.

When the judgment indicates departure of the automobile, the driver can be made aware of the departure aurally through a warning from warning means (not shown) provided at the driver's seat, for example, or visually through a lamp or display (not shown), for example. Otherwise, it is possible to forcibly actuate the steering system of the automobile to recover the automobile from the departure.

Figure 3:
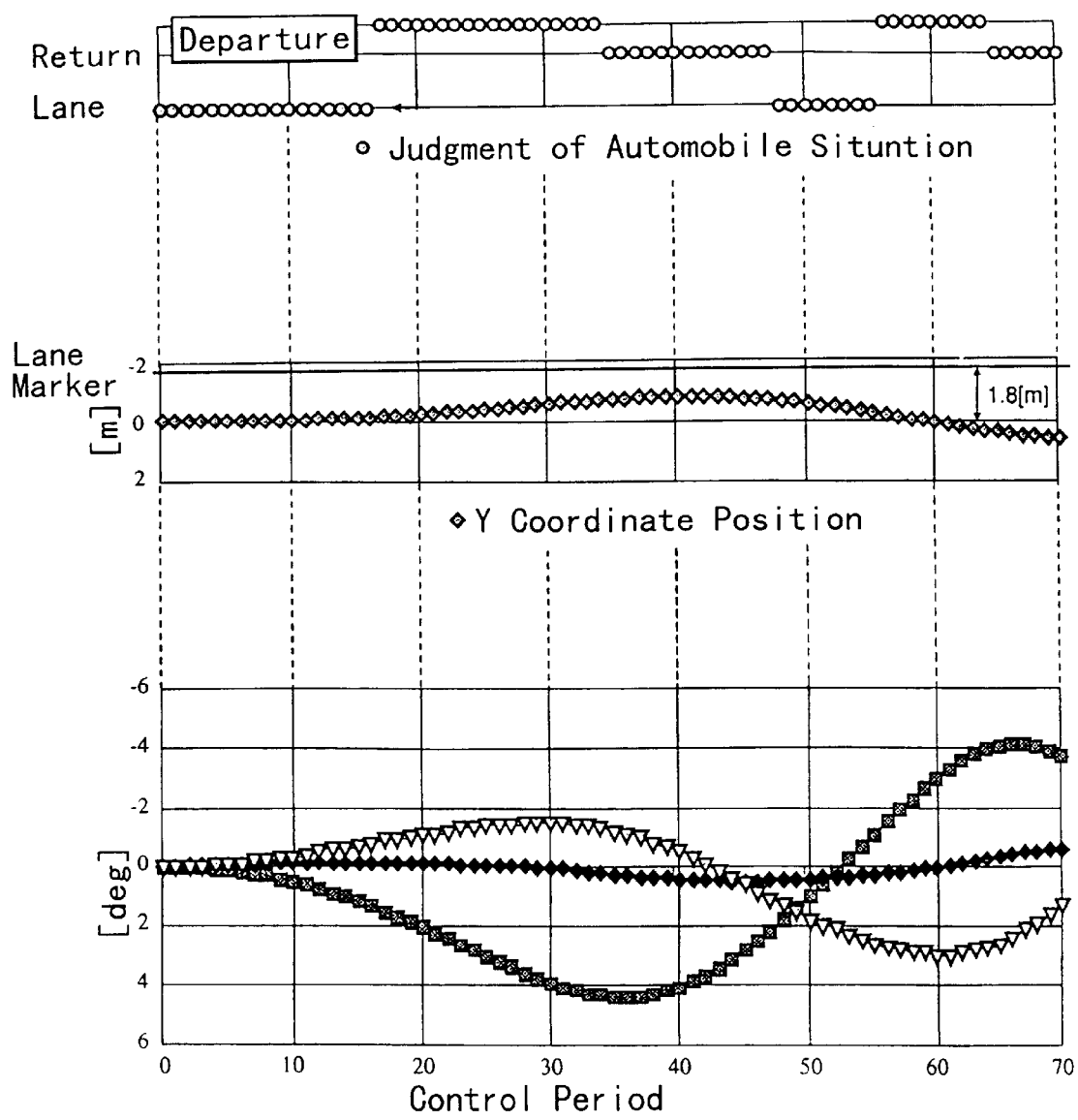

FIG. 3 is a diagram showing the results of simulation of actual driving of the automobile 1. A white lane partitioning line on a straight lane was used as a marker 4. The automobile 1 was driven so that the center of the automobile 1 could be positioned at a distance of 1.8 m from the marker 4, and the television camera 2 was used to take pictures of the marker.

The marker 4 was searched in the field of view with search lines every 2 m between 2 m and 20 m in the simulation. The running velocity and control frequency period of the automobile 1, and the threshold value were 50 Km/h, 0.1 sec, and 1.5 deg, respectively.

As shown in FIG. 3, departure from the traffic lane could be detected in the course of running of the automobile, and the running situations of the automobile relative to the traffic lane could be recognized.

Industrial Applicability:

As has been described in the foregoing, according to the present invention it is possible to judge the situations of an automobile by merely causing the automobile to run on an existing traffic lane and to recognize with high accuracy whether or not the automobile departs from the lane. Therefore, it can be found that traffic accidents and the like can be reduced to a great extent if the circumstantial judgment is utilized in the form of an output signal. Furthermore, the present invention can effectively utilize a two-dimensional field of view in front of the automobile and exhibit an effective characteristic that the automobile can smoothly be steered robustly.

What is claimed is:

1. A method characterized in that it is detected whether an automobile is running in a direction departing from a traffic lane, has already departed from the lane, or is running in a direction recovering from departure by:

mounting, on the automobile, steering angle detecting means for detecting an actual steering angle based on steering wheel operation of a driver, a television camera for taking pictures of the lane and a computer for processing the pictures taken by the television camera;

using the television camera to take pictures of markers on the lane while the automobile is running on the lane;

inputting video signals into the computer; and using the computer to process the input signals, thereby setting a virtual reference line, forming a cubic curve approximating the set virtual reference line, calculating a virtual standard steering angle from a coefficient of a function representing the cubic curve, and comparing the actual steering angle detected by the steering angle detecting means based on the steering wheel operation of the driver with the virtual standard steering angle calculated by the computer.

2. An apparatus characterized in that it is detected whether an automobile is running in a direction departing from a traffic lane, has already departed from the lane, or is running in a direction recovering from departure and comprising:

steering angle detecting mean for detecting an actual steering angle based on steering wheel operation of a driver, a television camera for taking pictures of the lane and a computer for processing the pictures taken by the television camera, that are mounted on the automobile;

said computer comprising video signal processing means that processes signals of pictures of a lane marker taken by the television camera, reference line setting means that sets a virtual reference line based on the processed signals output from the video signal processing means, steering angle calculating means that forms a cubic curve based on signals output from the reference line setting means and calculates a virtual standard steering angle based on a coefficient of a function represented by the cubic curve, and comparing means that compares the actual steering angle from the steering angle detecting means with the standard steering angle from the steering angle calculating means.

* * * * *